US006892311B2

United States Patent
Coppock et al.

(10) Patent No.: US 6,892,311 B2
(45) Date of Patent: May 10, 2005

(54) SYSTEM AND METHOD FOR SHUTTING DOWN A HOST AND STORAGE ENCLOSURE IF THE STATUS OF THE STORAGE ENCLOSURE IS IN A FIRST CONDITION AND IS DETERMINED THAT THE STORAGE ENCLOSURE INCLUDES A CRITICAL STORAGE VOLUME

(75) Inventors: John C. Coppock, Austin, TX (US); Weimin Pan, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 555 days.

(21) Appl. No.: 10/141,414

(22) Filed: May 8, 2002

(65) Prior Publication Data

US 2003/0212923 A1 Nov. 13, 2003

(51) Int. Cl.$^7$ ............................. G06F 1/28; G06F 11/00
(52) U.S. Cl. ............................. 713/300; 714/24; 714/48
(58) Field of Search .......................... 713/300; 714/24, 714/48

(56) References Cited

U.S. PATENT DOCUMENTS

| | | | | |
|---|---|---|---|---|
| 5,337,413 A | * | 8/1994 | Lui et al. ........................ | 710/2 |
| 5,615,077 A | | 3/1997 | Takizawa et al. ........... | 361/103 |
| 5,717,934 A | | 2/1998 | Pitt et al. ..................... | 395/750 |
| 6,098,146 A | * | 8/2000 | Bouvier et al. .............. | 711/100 |
| 6,434,498 B1 | * | 8/2002 | Ulrich et al. ................. | 702/115 |
| 6,502,203 B2 | * | 12/2002 | Barron et al. .................. | 714/4 |
| 6,609,204 B1 | * | 8/2003 | Olarig et al. ............... | 713/200 |
| 6,792,550 B2 | * | 9/2004 | Osecky et al. .............. | 713/300 |

FOREIGN PATENT DOCUMENTS

| | | | | |
|---|---|---|---|---|
| WO | WO 00/58846 | 10/2000 | ........... | G06F/13/40 |

OTHER PUBLICATIONS

IBM Manual, "Expandable Storage Plus 2104 Models DU3 and TU3 Hardware Technical Information", SA33–3309–00, 26 pages, Oct. 2000.
IBM Manual, "Expandable Storage Plus 2104 Models DU3 and TU3 Operator's Guide", SA33–3310–00. 118 pages, Oct. 2000.

* cited by examiner

Primary Examiner—Dennis M. Butler
Assistant Examiner—Mark Connolly
(74) Attorney, Agent, or Firm—Baker Botts L.L.P.

(57) ABSTRACT

A method of shutting down an information handling system is disclosed. Power is provided to a storage enclosure that includes a first storage device, a first operating condition monitor, and a first operating condition indicator having at least a first status and a second status. The status of the first operating condition indicator is updated based on the first operating condition monitor. One or more storage volumes are configured utilizing at least a portion of the storage enclosure. A first host detects the status of the first operating condition indicator. In response to detecting the first status of the first operating condition indicator, the first host determines whether the storage enclosure includes at least a portion of a critical storage volume and sends a shut down command from the first host to the storage enclosure. If the storage enclosure includes at least a portion of a critical storage volume, the first host is shut down.

28 Claims, 4 Drawing Sheets

SYSTEM AND METHOD FOR SHUTTING DOWN A HOST AND STORAGE ENCLOSURE IF THE STATUS OF THE STORAGE ENCLOSURE IS IN A FIRST CONDITION AND IS DETERMINED THAT THE STORAGE ENCLOSURE INCLUDES A CRITICAL STORAGE VOLUME

TECHNICAL FIELD

The present disclosure relates generally to the field of information handling systems and, more particularly, to a method of thermal shut down and failure status capture in a storage enclosure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include subsystems that monitor the physical health characteristics of system components, such as temperature, voltage, fans, power supplies, and chassis intrusion. These types of subsystems can be referred to as operating condition monitors. One example operating condition monitor would be a temperature probe. Such monitoring subsystems can also monitor hardware-detected faults in the operation of system components. Some operating conditions can lead to permanent damage to components of an information handling system. If a hard drive becomes too hot, for example, the physical structure may be damaged such that further operation is impossible. In order to avoid such losses, operating condition monitors can be connected to systems that will automatically instigate measures to correct the operating condition problem. For example, an information handling system could stop providing power to a component that was overheating.

When a number of information handling systems are coupled together, a loss of functionality by one system can affect other systems. For example, if a personal computer is communicating with a mainframe through a switch to retrieve database information, a shut down of either of the two latter information handling systems, the switch and the mainframe, would affect the personal computer. Thus, if the operating condition monitored at one information handling system might lead to a shut down of that system, operation of another system could be impacted. Such an impact could include decreased functionality, a crashed application, a crashed operating system, or loss of valuable data.

SUMMARY

In accordance with the present disclosure, a method of shutting down an information handling system is disclosed. Power is provided to a storage enclosure that includes a first storage device, a first operating condition monitor, and a first operating condition indicator having at least a first status and a second status. The status of the first operating condition indicator is updated based on the first operating condition monitor. One or more storage volumes are configured utilizing at least a portion of the storage enclosure. A first host detects the status of the first operating condition indicator. In response to detecting the first status of the first operating condition indicator, the first host determines whether the storage enclosure includes at least a portion of a critical storage volume and sends a shut down command from the first host to the storage enclosure. If the storage enclosure includes at least a portion of a critical storage volume, the first host is shut down.

In another implementation of the present disclosure, an information handling system is disclosed. The system includes a power source connected to a storage enclosure. The storage enclosure has a first storage device, a first operating condition monitor, and a first operating condition indicator that is coupled to the monitor. The indicator has at least a first status and a second status. The storage enclosure is adapted to access one or more storage volumes. The system also includes a first host that is communicatively coupled to the storage enclosure. The first host is adapted to detect the status of the storage enclosure indicator. When the first host detects that the first status of the indicator, it determines whether any of the storage volumes accessed at least in part in the storage enclosure are critical. If at least one is critical, the host initiates its own shut down process. In either case, the host sends a shutdown command to the storage enclosure.

A technical advantage of the present disclosure is that information handling systems are shut down in response to operating conditions. Another technical advantage of the present disclosure is that a host can shut itself down rather than crashing when a storage enclosure with critical data needs to be shut down due to operating conditions. Another technical advantage of the present disclosure is that two or more hosts can coordinate the shutdown of a storage enclosure. Other technical advantages will be apparent to those of ordinary skill in the art in view of the following specification, claims, and drawings. Various embodiments and implementations of the present disclosure obtain only a subset of the advantages set forth. No one advantage is critical to the present disclosure. For example, one embodiment of the present disclosure may only provide the advantage of shutting down an information handling system in response to operating conditions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
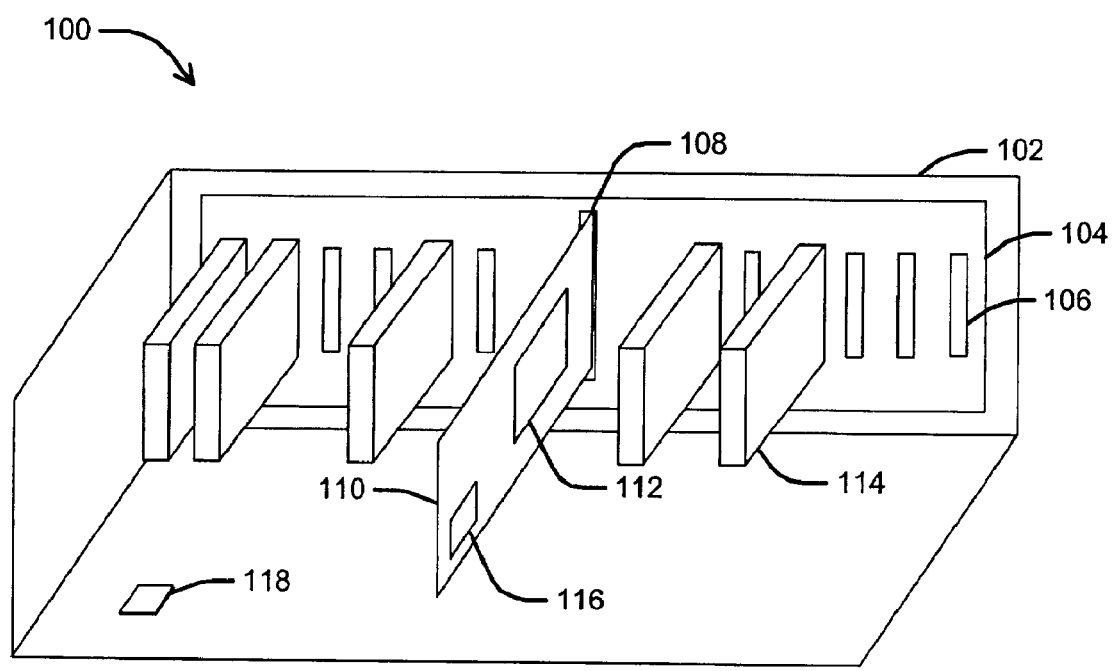
FIG. 1 is a view of an example storage enclosure.

The present disclosure concerns a method for shutting down an information handling system and the system employing that method. FIG. 1 illustrates an example storage enclosure, with which the disclosed system and method can be employed. The storage enclosure is designated generally as 100. The components are contained in a case or cabinet 102. A backplane 104 is located inside the case 102 and serves as the printed circuit board or PCB through which the devices that make up the storage enclosure 100 communicate with each other and with other computers. Mounted on the backplane 104 are connectors 106 for storage devices. One type of storage device is a hard drive 114, which could use a SCSI connector to be attached to the backplane 104. The backplane also includes a connector 108 for a processor card 110. The processor card 110 includes a processor 112.

The storage enclosure 100 stores data on the hard drives 114. The data can be organized in units different than the physical units of the hard drives 114. For example, a single physical hard drive can contain two volumes of storage. Conversely, a single volume of storage can use multiple physical hard drives. A single volume of storage could use space on multiple hard drives present in separate storage enclosures.

The operating conditions of the storage enclosure 100 can be monitored to decrease the chance of system damage. For example, both the processor 112 and the hard drives produce heat when they operate. Temperature probes 116, 118 can be used to warn the system software that the temperature is approaching levels where operation may be affected or damage may occur. One temperature probe 116 is monitoring the temperature of a specific component, the processor card 110. Another temperature probe 118 is monitoring the storage enclosure temperature more generally. The temperature probes 116, 118 are coupled to the processor so that the software can react to the temperature level. In one implementation, a status page is maintained, see FIG. 3A for a more detailed discussion. The readings from the temperature probes 116, 118 are used to generate the contents of the status page, which can be read by other computers.

Figure 2A:
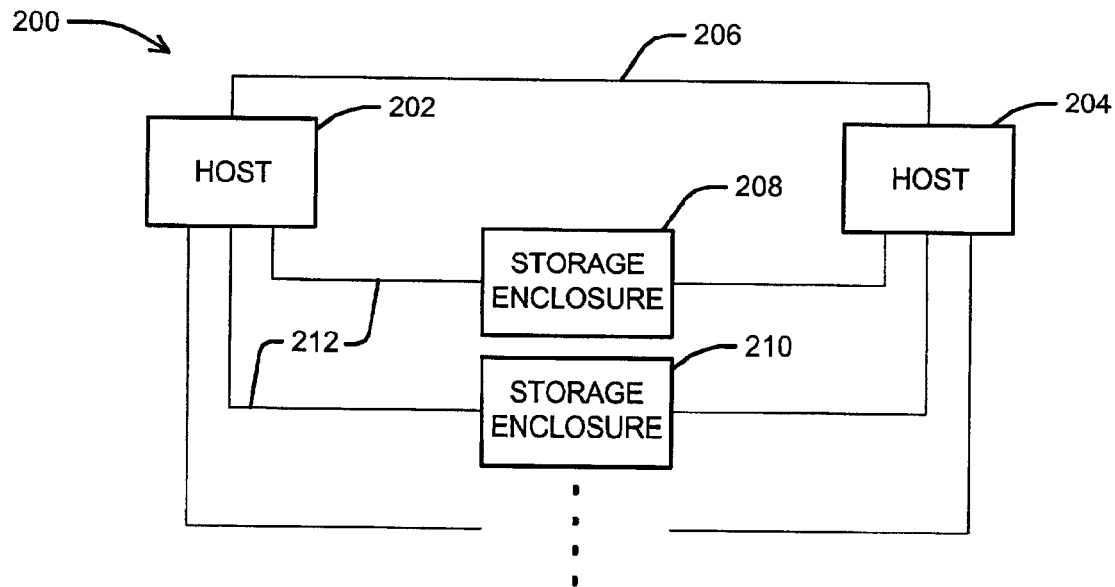
FIGS. 2A and 2B are block diagrams of two example implementations of an information handling system.
Figure 2B:
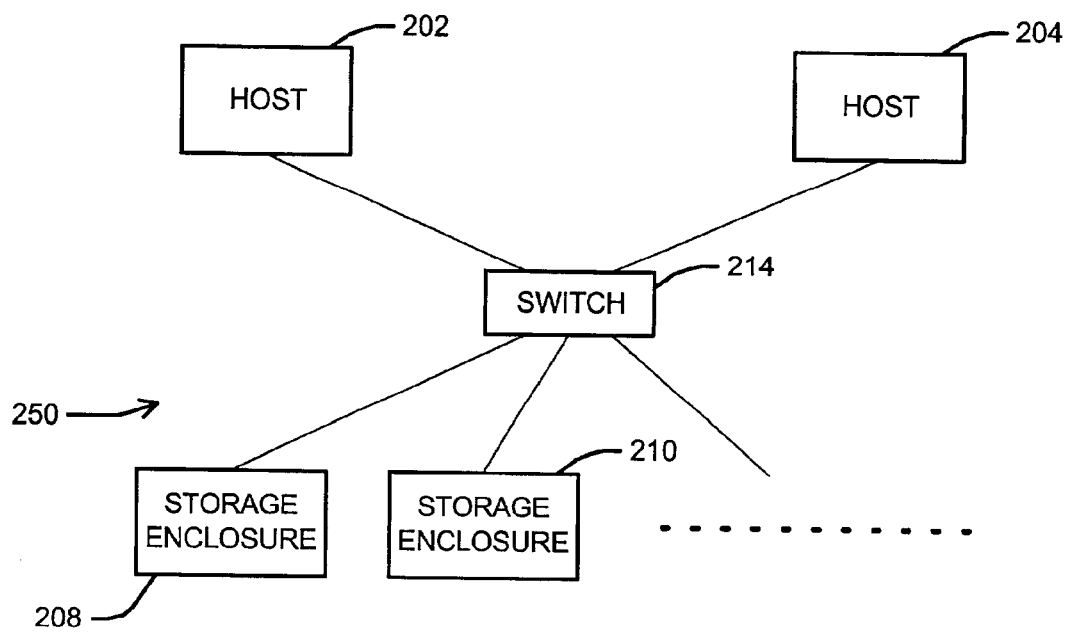

FIG. 2A depicts an example information handling system 200. A plurality of storage enclosures 208, 210 are each connected to a first host 202 and a second host 204. Additional hosts can also be added to the system. As indicated, more than two storage enclosures can be included. The hosts 202, 204 can communicate directly through a bus 206 or other communications medium. Each of the storage enclosures 208, 210 is communicatively coupled 212 to each of the hosts 202, 204. While the hosts and storage enclosures are shown as separate blocks, in some implementations the hosts and storage enclosures could be processes run in a single computer or other type of information handling system. In one implementation the coupling 212 is SCSI. FIG. 2B depicts a different example information handling system 250. In this system, the hosts 202, 204 communicate with the storage enclosure 208, 210 by means of a switch 214. In one implementation, the switch 214 is a router for a packet-based communications protocol. The communications links between the hosts and storage enclosures in both systems are used to transfer data from a host to a storage enclosure, from a storage enclosure to a host, and for administrative communications.

Figure 3A:
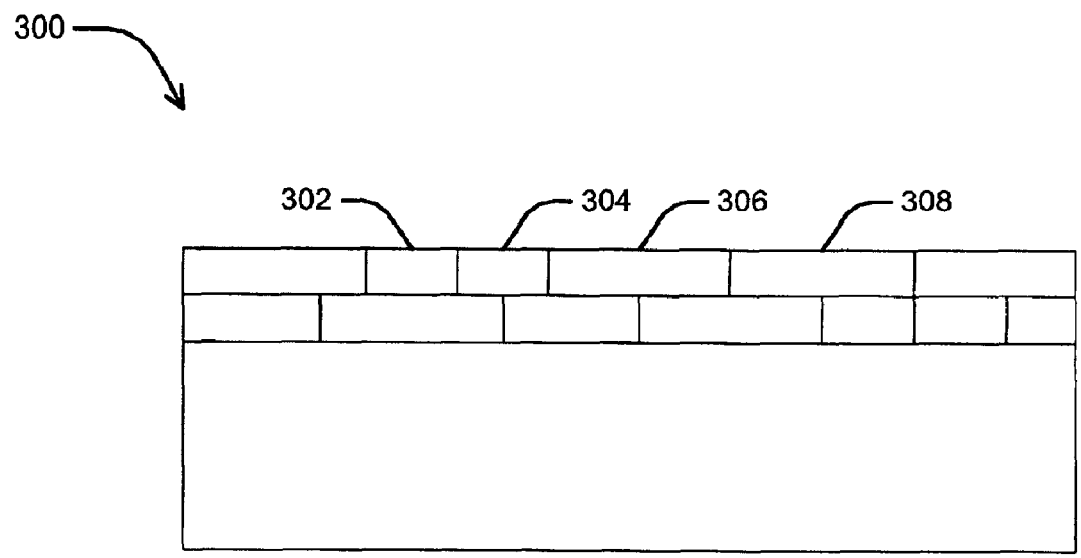
FIG. 3A is a diagram of a storage enclosure status page.

FIG. 3A depicts a diagram of a storage enclosure status page 300. The page is a number of items stored in memory for a storage enclosure. The page can include a large number of items in addition to a thermal critical bit 302, a thermal shut down bit 304, and temperature probe readings 306, 308. The thermal critical bit 302 can be set based on individual thermal bits. For example, if a storage enclosure includes three temperature probes, a thermal bit can be set for each temperature probe having a first status and a second status. The first status is set when the detected temperature is above a specified amount. The second status is set when the detected temperature is below the specified amount. The thermal critical bit 302 can then be set to the first status when any of the individual thermal bits is set to that status. Thus, if any temperature probe detects a temperature greater than the allowed temperature for that probe, the thermal critical bit 302 is set to the first status. In one implementation, the first status is 1 and the second status is 0. A host can communicate a request to have a storage enclosure transmit its status page including the thermal critical bit 302, the thermal shut down bit 304, and the temperature probe readings 306, 308.

Figure 3B:
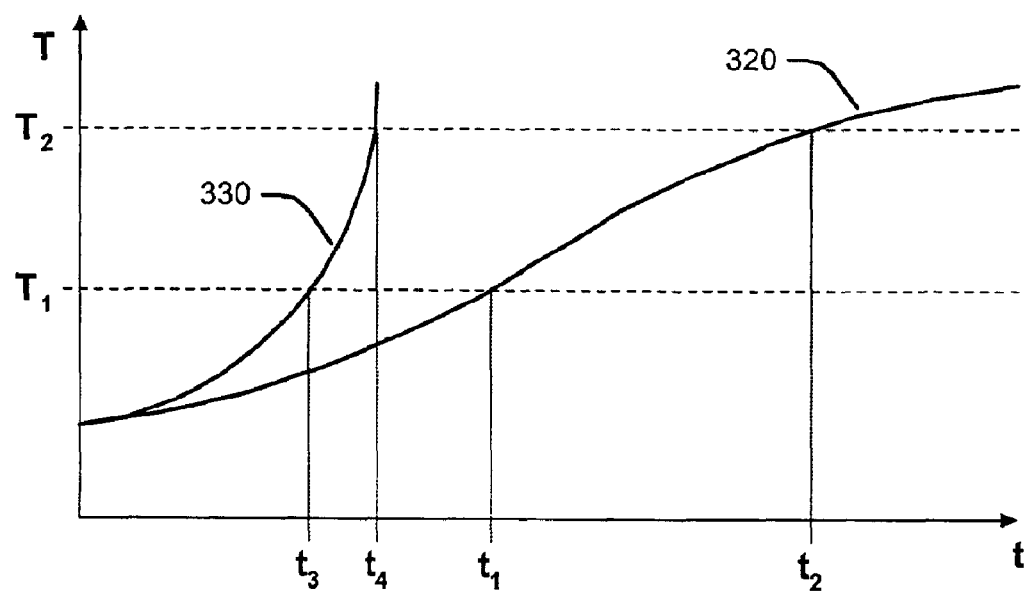
FIG. 3B is a graph of temperature and shut down limits.

FIG. 3B depicts a graph of temperature and shut down limits. The graph shows two separate shut down limits $T_1$ and $T_2$. While FIG. 3B only shows a single temperature, a storage enclosure having multiple temperature probes can utilize multiple temperature limits for each probe. The two temperature limits can be set and modified. The first temperature limit $T_1$ initiates a delayed shut down procedure. When the temperature of the probe reaches T1 at time t1, the individual thermal bit for that probe is set to the first status, and thereby the thermal critical bit as well if it is not already set. The second temperature $T_2$ initiates an automatic and immediate shut down procedure. In alternate implementations, different temperature limits could be used. For example, a third temperature limit between the first and the second could trigger eliminating certain components of the longer shutdown procedure initiated in response to reaching the first temperature limit. During a first example heating event 320, the difference between the time $t_1$ that the first temperature limit is reached and the time $t_2$ that the second temperature limit is reached is sufficient for the storage enclosure, and if necessary one or more hosts as discussed in more detail with regard to FIG. 4, to complete its shut down procedure. Such a procedure can include recording status information, such as the data in the status page 300, to a nonvolatile memory. In one implementation, the nonvolatile memory is an EEPROM.

During a second example heating event 330, the difference between the time $t_3$ that the first temperature limit is reached and the time $t_4$ that the second temperature limit is reached is shorter than the time required to complete the shut down procedure. As a result, the shut down procedure is interrupted by an immediate shut down at time $t_4$. In one implementation, the immediate shut down is accomplished by disconnecting the storage enclosure from its power supply. The immediate shut down decreases the risk of heat-related damage to the storage enclosure components.

Figure 4:
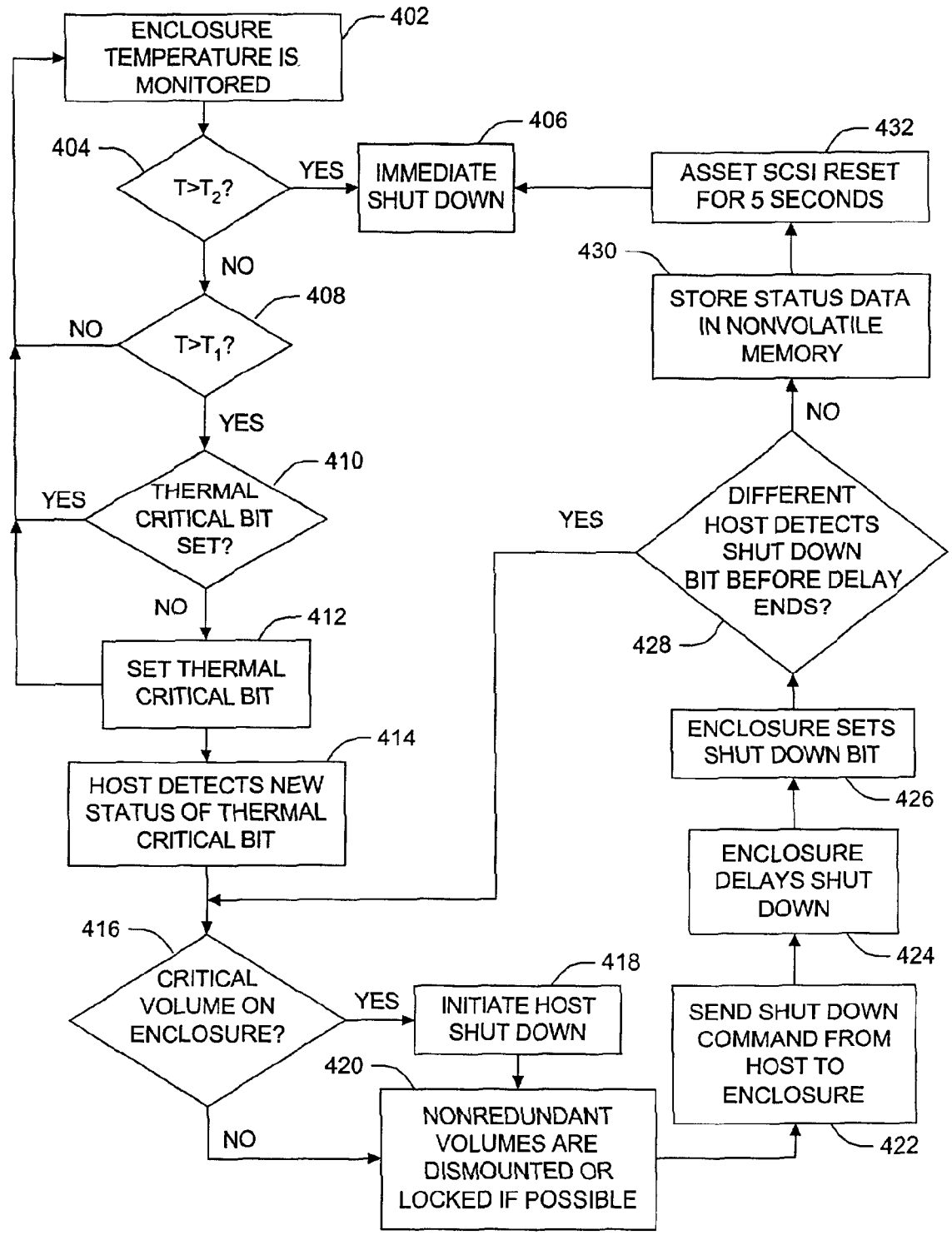
FIG. 4 is a flow diagram of a shut down method.

FIG. 4 depicts a flow diagram of one method of the present disclosure. The enclosure temperature, an operating condition, is monitored 402. If the enclosure temperature T is greater than the second temperature limit $T_2$ 404, an immediate shut down occurs 406. If the temperature is less than $T_2$, it is compared to $T_1$ 408. If the temperature is less than $T_1$, then the enclosure is operating within that specified condition and temperature monitoring continues 402. If the temperature is greater than $T_1$, then the thermal critical bit is set 412 if it has not already been set 410. In one implementation, the thermal critical bit is set by changing its status from a second status to a first status. In one implementation, the second status is the value zero and the first status is the value one. The thermal critical bit can also be set by setting a thermal bit corresponding to the temperature being measured. The thermal critical bit is then updated to reflect the new status of the thermal bit. Whether or not the thermal critical bit has been set, the enclosure continues to monitor temperature 402. If the temperature exceeds $T_2$ at any time, an immediate shut down results 406.

A first host periodically checks the status page of each storage enclosure to which it is communicatively coupled and detects the changed thermal critical bit status after it occurs 414. In response to detecting the thermal critical bit having been set, the host determines whether the storage enclosure has a critical volume 416. The system software can identify particular volumes as critical according to preset rules. As one example, a volume that contains non-redundant files needed to run the host operating system could be considered critical. As another example, a volume that contains nonredundant page files could be considered critical. In one implementation, a volume is considered on an enclosure even though only a portion of the volume is associated with that enclosure. For example, a volume containing critical operating system files can be defined to include storage on hard drives in two separate storage enclosure. If either storage enclosure sets its thermal critical bit 412, the host would consider that storage enclosure to contain a critical volume.

If the host determines that a critical volume is on the storage enclosure 416, the host initiates its own shut down 418. Whether or not there are one or more critical volumes, nonredundant volumes on the storage enclosure are dismounted or locked if possible 420. A shut down command is sent from the host to the storage enclosure 422. In response to receiving the shut down command, the enclosure initiates a delay 424 and sets the shut down bit in its status page 426. The delay allows other hosts that are coupled to the storage enclosure to detect the shut down status and take appropriate actions. In one implementation, the hosts check on their storage enclosures asynchronously. The first host detected the thermal critical bit at a time that the second host was not checking the status page. When the second host checks the status page later, the shut down bit has already been set and the storage enclosure is delaying shut down. The extent of the delay can be set to allow all the connected hosts to read the shut down bit and respond before shut down occurs in the worst case scenario where the second host had just checked the status page immediately before the thermal critical bit was set. Once the second host detects the shut down bit 428, the second host follows the same procedure 416–424 that the first host followed. In one implementation, a volume that is critical to the first host is not necessarily critical to the second host. More than two hosts can be connected to a single storage enclosure. When the storage enclosure receives the shut down command from the second hosts, it resets the delay 424 allowing the second host to complete its own shut down, if necessary.

Once the last delay expires without any additional shut down commands being received, the storage enclosure stores data in nonvolatile memory 430. In one implementation, the data from the storage enclosure status page is stored in an EEPROM. If the storage enclosure is connected to the hosts through SCSI, asset SCSI is reset for 5 seconds 432. This flushes the disk cache. In other implementations, different procedures can be used to force the disk drive to flush its cache. The actual loss of power and resulting immediate shut down 406 then occur.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a storage enclosure connected to a power source and including a first storage device, a first operating condition monitor, and a first operating condition indicator coupled to the first operating condition monitor, the first operating condition indicator having at least a first status and a second status, the storage enclosure adapted to access one or more storage volumes;
   a first host communicatively coupled to the storage enclosure and adapted to detect the status of the first operating condition indicator; and
   wherein the first host, in response to detecting the first status of the first operating condition indicator, determines whether the storage enclosure includes at least a portion of a critical storage volume and sends a shut down command to the storage enclosure; and if the storage enclosure includes at least a portion of a critical storage volume, the first host shuts itself down.

2. The information handling system of claim 1, wherein the first operating condition indicator is a thermal critical bit.

3. The information handling system of claim 1, wherein the first status is a high temperature status.

4. The information handling system of claim 1, wherein a storage volume containing a nonredundant operating system is a critical storage volume.

5. The information handling system of claim 1, wherein the storage enclosure includes a shut down indicator having at least a first status and a second status and further comprising:
   a second host communicatively coupled to the storage enclosure and adapted to detect the status of the shut down indicator; and
   wherein the storage enclosure, in response to receiving the shut down command from the first host, sets the shut down indicator to the first status and begins a delayed shut down operation having a first delay; the second host, in response to detecting the first status of the shut down indicator, determines whether the storage enclosure includes at least a portion of a critical storage volume; and if the storage enclosure includes at least a portion of a critical storage volume, the second host sends a shut down command to the storage enclosure and shuts itself down; the storage enclosure, in response to receiving the shut down command from the second host, begins a delayed shut down operation having the first delay.

6. The information handling system of claim 5, wherein the first and second hosts are adapted to asynchronously detect the status of the storage enclosure indicators.

7. The information handling system of claim 5, wherein the second host is adapted to detect the status of the shut down indicator at intervals smaller than the first delay.

8. The information handling system of claim 1, wherein the first host is communicatively coupled to the storage enclosure through one of a router, hub, or switch.

9. The information handling system of claim 1, further comprising a plurality of additional storage enclosures communicatively coupled to the first host.

10. The information handling system of claim 1, wherein the storage enclosure includes a automatic shut down device coupled to the first operating condition monitor, the automatic shut down device adapted to immediately disconnecting the power source from the storage enclosure in response to a particular operating condition.

11. The information handling system of claim 1, wherein the operating condition monitor is a temperature probe.

12. The information handling system of claim 1, wherein the storage enclosure, in response to receiving the shut down command from the first host, begins a delayed shut down operation having a first delay of greater length than the duration of a first host shut down.

13. The information handling system of claim 1, wherein a storage volume containing a nonredundant page file is a critical storage volume.

14. The information handling system of claim 1, wherein the storage enclosure, in response to receiving the shut down command from the first host, begins a shut down operation that includes logging status data to a nonvolatile memory.

15. A method of shut down, comprising the steps of:
providing power to a storage enclosure that includes a first storage device, a first operating condition monitor, and a first operating condition indicator having at least a first status and a second status;
updating the status of the first operating condition indicator based on the first operating condition monitor;
configuring one or more storage volumes utilizing at least a portion of the storage enclosure;
detecting the status of the first operating condition indicator at a first host;
in response to detecting the first status of the first operating condition indicator, determining whether the storage enclosure includes at least a portion of a critical storage volume
in response to detecting the first status of the first operating condition indicator, sending a shut down command from the first host to the storage enclosure; and
if the storage enclosure includes at least a portion of a critical storage volume, shutting the first host down.

16. The method of claim 15, wherein the first operating condition indicator is a thermal critical bit.

17. The method of claim 15, wherein the first status is a high temperature status.

18. The method of claim 15, wherein a storage volume containing a nonredundant operating system is a critical storage volume.

19. The method of claim 15, wherein the storage enclosure includes a shut down indicator having at least a first status and a second status and further comprising the steps of:
detecting the status of the shut down indicator at a second host;
in response to the storage enclosure receiving the shut down command from the first host, setting the shut down indicator to the first status and beginning a delayed shut down operation having a first delay
in response to the second host detecting the first status of the shut down indicator, determining whether the storage enclosure includes at least a portion of a critical storage volume;
if the storage enclosure includes at least a portion of a critical storage volume, sending a shut down command from the second host to the storage enclosure and shutting the second host down; and
in response to the storage enclosure receiving the shut down command from the second host, beginning a delayed shut down operation having the first delay.

20. The method of claim 19, wherein the first and second hosts are adapted to asynchronously detect the status of the storage enclosure indicators.

21. The method of claim 19, wherein the second host is adapted to detect the status of the shut down indicator at intervals smaller than the first delay.

22. The method of claim 15, wherein the first host detects the status of the first operating condition indicator through one of a router, hub, or switch.

23. The method of claim 15, wherein the first host is communicatively coupled to a plurality of additional storage enclosures.

24. The method of claim 15, further comprising the step of:
disconnecting power from the storage enclosure in response to a particular operating condition.

25. The method of claim 15, wherein the operating condition monitor is a temperature probe.

26. The method of claim 15, further comprising the step of:
in response to the storage enclosure receiving the shut down command from the first host, beginning a delayed shut down operation having a first delay of greater length than the duration of a first host shut down.

27. The method of claim 15, wherein a storage volume containing a nonredundant page file is a critical storage volume.

28. The method of claim 15, further comprising the step of:
in response to the storage enclosure receiving the shut down command from the first host, beginning a shut down operation that includes logging status data to a nonvolatile memory.

* * * * *